US008585494B2

(12) United States Patent
Parrinello et al.

(10) Patent No.: US 8,585,494 B2

(45) Date of Patent: Nov. 19, 2013

(54) SYSTEM ARCHITECTURE FOR WIDE-AREA WAGERING GAME AND METHODS FOR CONDUCTING WIDE-AREA WAGERING GAMES

(75) Inventors: Chris Parrinello, Rolling Meadows, IL (US); Craig J. Sylla, Round Lake, IL (US); Jeremy M. Hornik, Chicago, IL (US); Erhard W. Rathsack, Reno, NV (US); Rory L. Block, Carson City, NV (US)

(73) Assignee: WMS Gaming Inc., Waukegan, IL (US)

( * ) Notice: Subject to any disclaimer, the term of this patent is extended or adjusted under 35 U.S.C. 154(b) by 47 days.

(21) Appl. No.: 13/276,438

(22) Filed: Oct. 19, 2011

(65) Prior Publication Data

US 2012/0094744 A1 Apr. 19, 2012

Related U.S. Application Data

(60) Provisional application No. 61/394,486, filed on Oct. 19, 2010.

(51) Int. Cl.
*A63F 13/12* (2006.01)

(52) U.S. Cl.
USPC .......................................... 463/27; 463/42

(58) Field of Classification Search
None
See application file for complete search history.

(56) References Cited

U.S. PATENT DOCUMENTS

| | | | | |
|---|---|---|---|---|
| 5,885,158 | A * | 3/1999 | Torango et al. | 463/27 |
| 5,941,773 | A | 8/1999 | Harlick | 463/26 |
| 6,146,273 | A | 11/2000 | Olsen | 463/27 |
| 6,565,434 | B1 | 5/2003 | Acres | 463/25 |
| 6,645,077 | B2 | 11/2003 | Rowe | 463/42 |
| 6,966,834 | B1 | 11/2005 | Johnson | 463/25 |
| 7,530,896 | B2 | 5/2009 | Gauselmann | 463/27 |
| 7,674,180 | B2 | 3/2010 | Graham et al. | 463/29 |
| 7,862,430 | B2 | 1/2011 | Baerlocher et al. | 463/29 |
| 7,878,893 | B1 | 2/2011 | Mayeroff | 463/16 |
| 7,887,415 | B2 | 2/2011 | Parham et al. | 463/27 |
| 7,931,530 | B2 | 4/2011 | Anderson et al. | 463/20 |
| 8,128,491 | B2 | 3/2012 | Vasquez et al. | 463/27 |
| 8,157,641 | B2 | 4/2012 | Englman | 463/25 |
| 8,257,169 | B2 | 9/2012 | Englman | 463/25 |

(Continued)

FOREIGN PATENT DOCUMENTS

| | | |
|---|---|---|
| JP | 2005-118270 | 5/2005 |
| JP | 2007-517535 | 7/2007 |
| WO | 02/070089 | 9/2002 |
| WO | 2005/016471 | 2/2005 |

*Primary Examiner* — Dmitry Suhol
*Assistant Examiner* — Jay Trent Liddle
(74) *Attorney, Agent, or Firm* — Nixon Peabody LLP

(57) ABSTRACT

A wagering game system wide-area central gaming controller (WAGC) determines a threshold trigger (TT) for awarding a wide-area award, divides a condition prerequisite for the TT into a set of discrete threshold units (TU), one of which is associated with the TT, and distributes to each local central gaming controller (LCGC) a block of the TU for evaluation against an outcome or wager from each eligible wagering game machine. The WAGC also subtracts the distributed block of the TU from the set of TU, continues distributing to each LCGC a block of the TU selected from the set of TU for evaluation against an outcome or wager from each eligible wagering game machine and subtracting the distributed block of the TU from the set of TU until one LCGC confirms to the WAGC that a wagering game machine satisfied the TT associated with a TU allocated to the relevant LCGC.

20 Claims, 6 Drawing Sheets

(56) References Cited

U.S. PATENT DOCUMENTS

| | | | | |
|---|---|---|---|---|
| 2003/0069057 | A1 | 4/2003 | DeFrees-Parrott | 463/16 |
| 2003/0100361 | A1 | 5/2003 | Sharpless et al. | 463/25 |
| 2004/0072613 | A1 | 4/2004 | Visocnik | 463/25 |
| 2004/0106448 | A1 | 6/2004 | Gauselmann | 463/25 |
| 2004/0235552 | A1 | 11/2004 | Gauselmann | 463/16 |
| 2005/0079911 | A1 | 4/2005 | Nakatsu | 463/26 |
| 2005/0215314 | A1 | 9/2005 | Schneider et al. | 463/26 |
| 2006/0025210 | A1 | 2/2006 | Johnson | 463/25 |
| 2006/0073887 | A1 | 4/2006 | Nguyen et al. | 463/27 |
| 2006/0116201 | A1 | 6/2006 | Gauselmann | 463/26 |
| 2006/0142079 | A1 * | 6/2006 | Ikehara et al. | 463/27 |
| 2006/0166731 | A1 | 7/2006 | Yoshimi et al. | 463/20 |
| 2006/0258422 | A1 | 11/2006 | Walker et al. | 463/7 |
| 2006/0258424 | A1 | 11/2006 | Green | 463/16 |
| 2007/0004505 | A1 | 1/2007 | Walker et al. | 463/26 |
| 2007/0060320 | A1 | 3/2007 | Kelly et al. | 463/27 |
| 2007/0222150 | A1 | 9/2007 | Wright et al. | 273/269 |
| 2008/0020830 | A1 * | 1/2008 | Ikehara et al. | 463/27 |
| 2008/0020831 | A1 * | 1/2008 | Ikehara et al. | 463/27 |
| 2008/0045288 | A1 | 2/2008 | Moshal et al. | 463/16 |
| 2009/0042641 | A1 | 2/2009 | Anderson et al. | 463/25 |
| 2009/0275410 | A1 | 11/2009 | Kisenwether et al. | 463/42 |
| 2010/0075733 | A1 | 3/2010 | Breslo | 463/17 |
| 2010/0105470 | A1 | 4/2010 | Englman | 463/27 |
| 2010/0203958 | A1 | 8/2010 | Jackson | 463/27 |
| 2010/0240447 | A1 | 9/2010 | Chan | 463/26 |
| 2011/0223991 | A1 * | 9/2011 | Powell et al. | 463/26 |

* cited by examiner

SYSTEM ARCHITECTURE FOR WIDE-AREA WAGERING GAME AND METHODS FOR CONDUCTING WIDE-AREA WAGERING GAMES

REFERENCE TO RELATED APPLICATIONS

This application is related to and claims priority to U.S. Provisional Patent Application Ser. No. 61/394,486, filed Oct. 19, 2011, and titled "System Architecture for Wide-Area Wagering Game and Methods for Conducting Wide-Area Wagering Games," which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to systems and methods for conducting wide-area wagering games.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

SUMMARY OF THE INVENTION

The present concepts implement aspects of architecture enhancements to a wide-area progressive triggered via a coin-in threshold (or other threshold), the architecture enhancements comprising the introduction of a wide-area Central Gaming Controller (CGC), and solutions to attendant problems created by these very architecture enhancements.

If each player's input of a wager and press of a spin button has to be communicated remotely and directly to a wide-area controller and corresponding "round trip" communication from the wide-area controller back to the player's EGM is greater than about 50 milliseconds, such latency is perceptible to a player and makes the EGM appear unresponsive and sluggish. In contrast, the "round trip" of signals between the EGMs 200 and local CGC 300 in accord with the present concepts is less than 50 milliseconds and is preferably less than 20 milliseconds, and still more preferably between about 10-15 milliseconds.

The concepts disclosed herein eliminate the potential delays in processing every single bet on a remote wide-area CGC by, for example, pushing the processing of every bet down from the wide-area CGCs to the local CGC level, which increases the amount of bandwidth needed for this application. In one example, the threshold, however defined, is in a shared state among the local casino CGCs. Local CGCs, via the wide-area CGCs, exchange wagers with the wide-area CGC and the amounts of these wagers are deducted from the shared state threshold in the wide-area CGC. In order for an EGM's bet to win the progressive, the associated local CGC would have to reach a consensus about the ordering of the wagers deducted from the threshold.

According to one aspect of the present invention, a gaming system for conducting a wagering game includes a wide-area central gaming controller and a communication system configured to communicatively couple the wide-area central gaming controller to one or more local central gaming controllers. The wide-area central gaming controller is operatively configured to (i) determine a threshold trigger for awarding a wide-area award, (ii) divide a condition prerequisite for the threshold trigger into a set of discrete threshold units, one of the threshold units being associated with the threshold trigger, and (iii) distribute to at least one of the one or more local central gaming controllers a block of the threshold units selected from the set of threshold units for evaluation against at least one of an outcome or a wager from each eligible wagering game machine connected thereto. The wide-area central gaming controller is also operatively configured to (iv) subtract the distributed block of the threshold units from the set of threshold units, (v) continue distributing to at least one of the one or more local central gaming controllers a block of the threshold units selected from the set of threshold units for evaluation against at least one of an outcome or a wager from each eligible wagering game machine connected thereto and subtracting the distributed block of the threshold units from the set of threshold units until one local central gaming controller confirms to the wide-area central gaming controller that a wagering game machine satisfied the threshold trigger associated with a threshold unit allocated to the relevant local central gaming controller, and (vi) award the wide-area award following to the wagering game machine satisfying the threshold trigger.

According to another aspect of the invention, a wagering game system comprises a local central gaming controller and a communication system configured to communicatively couple the local central gaming controller to both a wide-area central gaming controller and a plurality of wagering game machines. The local central gaming controller is operatively configured to (i) request from the wide-area central gaming controller a block of threshold units selected from an available set of threshold units, the set of threshold units comprising one threshold unit that is uniquely associated with a threshold trigger for a wide-area award managed by the wide-area central gaming controller, (ii) responsive to an input wager at a wagering game machine, assign a selected one or more of the remaining threshold units in the block of threshold units, corresponding to a wager level, to the input wager, and (iii) determine if the assigned one or more threshold units comprise the one threshold unit that is uniquely associated with the threshold trigger. The local central gaming controller is also operatively configured to (iv) subtract the assigned one or more threshold units from the available threshold units in the block of threshold units, and (v) continue performing acts (ii) through (iv) until at least substantially all threshold units in the block of threshold units have been assigned to respective wagers or until an assigned one or more threshold units is determined to comprise the one threshold unit that is uniquely associated with the threshold trigger. The local central gaming controller is further operatively configured to (vi) request from the wide-area central gaming controller another block of threshold units selected from an available set of threshold units if at least substantially all threshold units in the block of threshold units have been assigned to respective wagers and (v) notify the wide-area central gaming controller if an assigned one or more threshold units is determined to comprise the one threshold unit that is uniquely associated with the threshold trigger.

According to yet another aspect of the invention, a method of conducting a wagering game on a gaming system comprising the acts of using a wide-area gaming controller to determine a threshold trigger for awarding a wide-area award, using the wide-area gaming controller dividing a condition prerequisite for the threshold trigger into a set of discrete threshold units, one of the threshold units being uniquely associated with the threshold trigger and distributing a block of the threshold units selected from the set of threshold units to each of a plurality of local central gaming controllers. The method further comprises the acts of using a local gaming controller, assigning one or more threshold units responsive to each wager from an eligible wagering game machine connected to the local gaming controller, using the local gaming controller, determining if the one or more threshold units assigned to the eligible wagering game machine correspond to the one of the threshold units being uniquely associated with the threshold trigger, and using the local gaming controller, cycling through the block of threshold units responsive to input wagers at eligible wagering game machines connected to the local gaming controller until either at least substantially all threshold units have been utilized or until it is determined that an assigned one of the threshold units was uniquely associated with the threshold trigger.

According to yet another aspect of the invention, computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1:
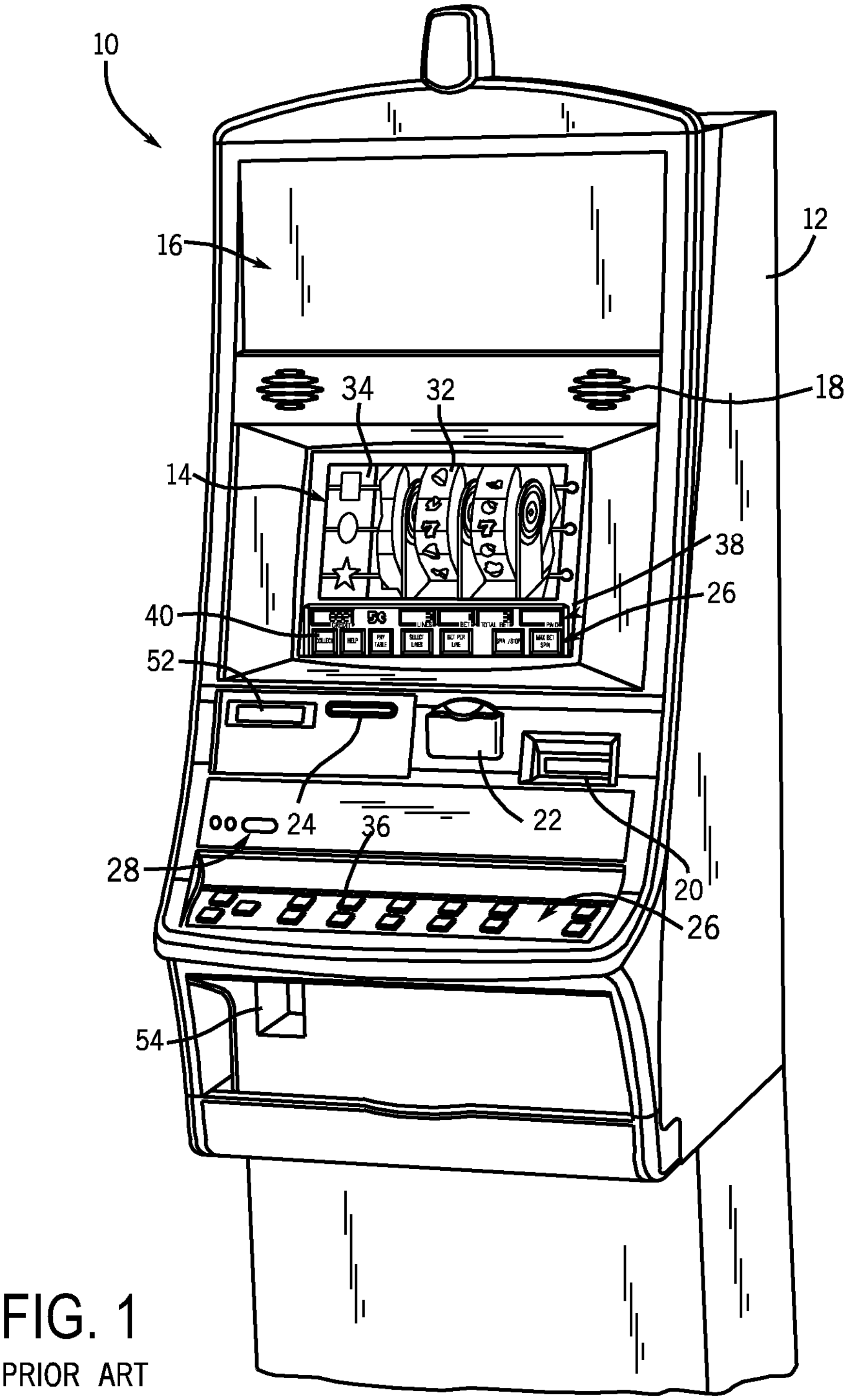
FIG. 1 PRIOR ART
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
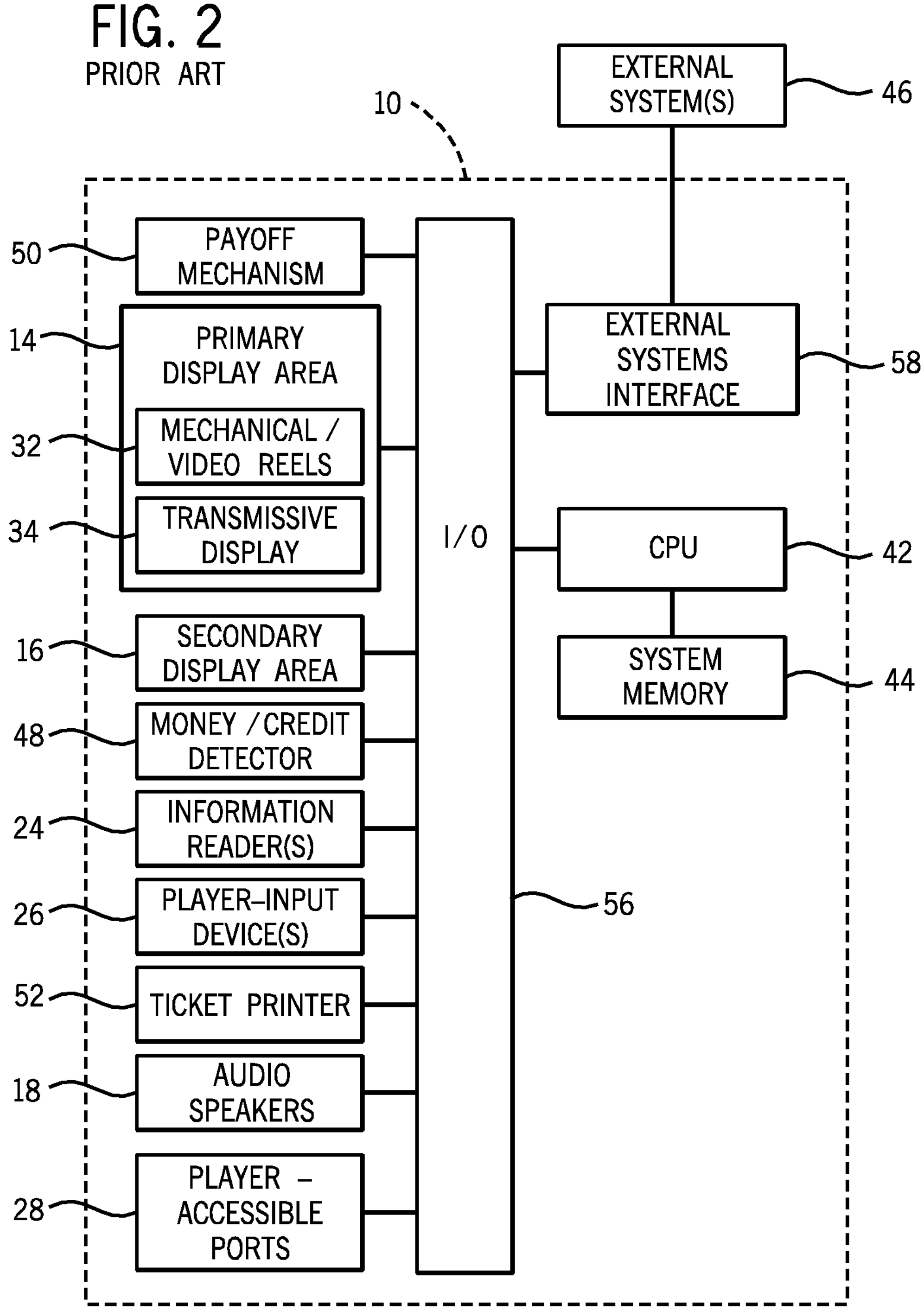
FIG. 2 PRIOR ART
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
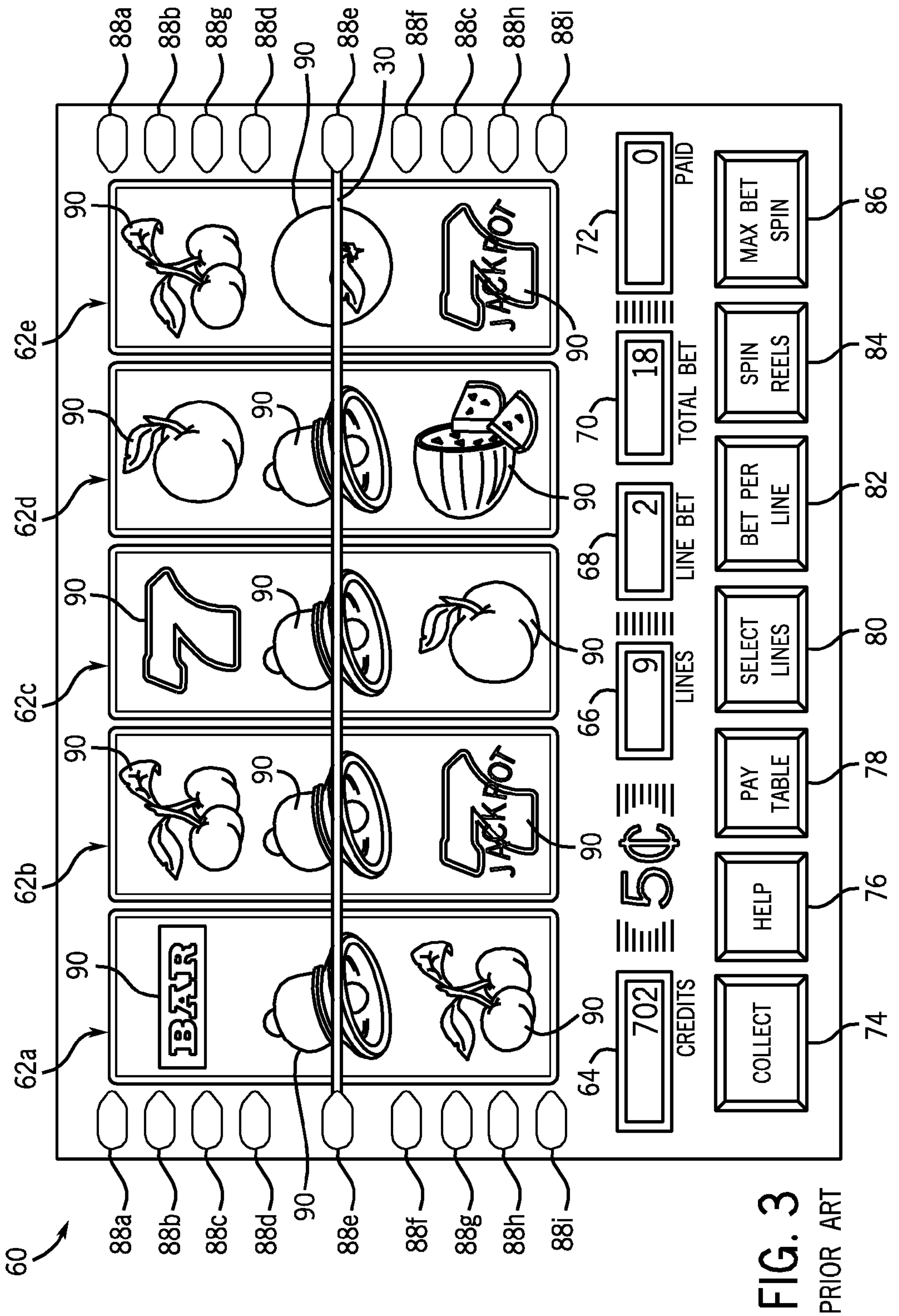
FIG. 3 PRIOR ART
FIG. 3 is an image of an exemplary basic-game screen of a wagering game displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
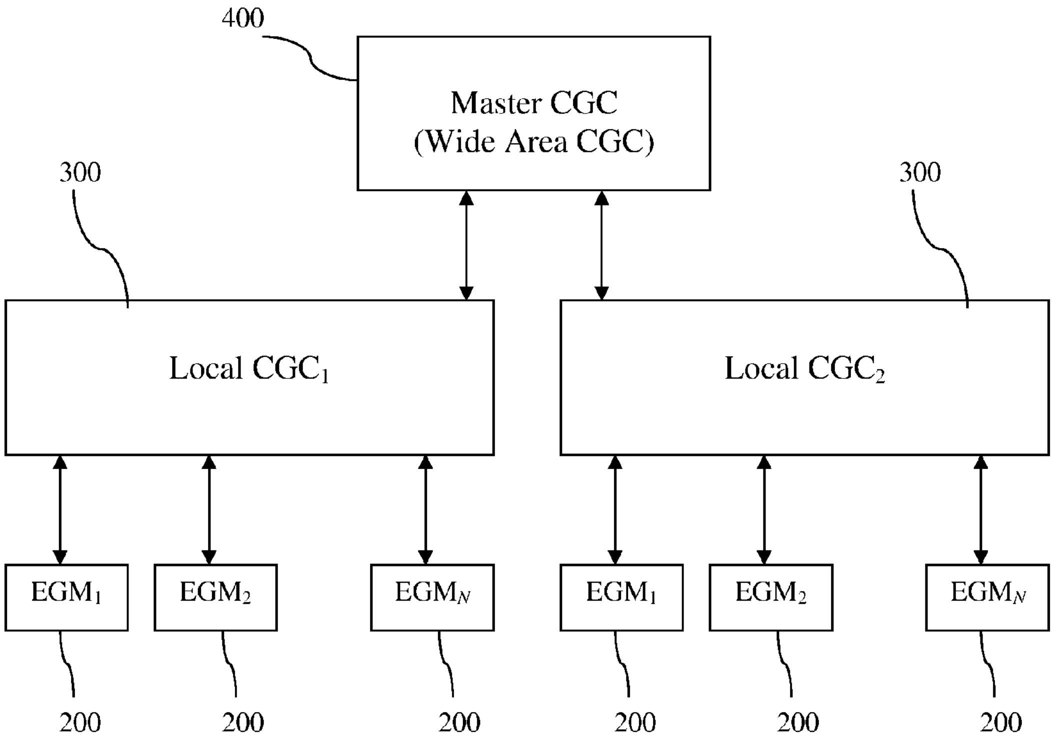
FIG. 4 is an illustration of a system architecture for conducting a wide-area wagering game in accord with aspects of the present concepts.

Returning to the system architecture in accord with the present concepts, FIG. 4 shows an example wherein a wide-area CGC 400 is configured to maintain and share a threshold units for a progressive game, or for another type of wagering game or related game, with one or more local casino CGCs 300, as described below.

During play of the base wagering game on an electronical gaming machine ("EGM") 200, a player actuates the spin button, or the like, on the EGM 200 and the player's wager associated with the actuation of the wagering game is sent to the local CGC 300 for processing in accord with the threshold trigger information received from the wide-area CGC 400. Depending on the math model for the particular threshold-based game (e.g., incrementing or decrementing) to be implemented on the wide-area CGC 400 and local CGCs 300, the wide-area CGC 400, in one aspect of the present concepts, modifies the differential to the threshold trigger in accord with the wager (e.g., decrements the wager from the threshold, decrements a portion of the wager from the threshold, etc.) and determines whether or not the then-modified differential to the threshold has crossed the threshold amount (e.g., increased or decreased beyond threshold trigger) to see if the player's wager triggered the progressive. If the player's wager has triggered the progressive game, the wide-area CGC 400 notifies the local CGC 300 associated with the respective EGM 200 that triggered the progressive as to the status and randomly determined outcome of the progressive, and the local CGC 300 so notifies the respective EGM 200. Although the wagers are processed at the local CGC 300 asynchronously (i.e. the EGM's do not need to wait for a response to the wager notification before spinning the reels), the local CGC 300 must respond to the wager notifications in a timely fashion, else delays will be introduced into game play while the EGMs 200 wait for the wager notification response before completing the spin.

Represented in FIG. 4 is an architecture suitable for implementing threshold-based gameplay in accord with at least some aspects of the present concepts, such as a wide-area progressive (WAP) or other desired game in which wagers from across a number of clients (e.g., different gaming establishments), represented by local central gaming controllers $CGC_1$, $CGC_2$ 300, are monitored or managed. Each of the local central gaming controllers $CGC_1$, $CGC_2$ 300 are in communication with various EGMs 200 ($EGM_1$, $EGM_2$, . . . $EGM_N$) and are also in communication with a wide-area CGC 400 that is responsible for determining the threshold level or turnover amount and coordinating game play across gaming establishments (e.g., $CGC_1$, $CGC_2$, etc.).

As noted above, the wide-area CGC 400 may advantageously maintain the WAP levels. In such configuration, all wagers made at each EGM 200 would be first sent to the local casino CGC 300, which would then in turn, pass the wager (or a portion thereof) to the wide-area CGC 400, which would decrement (or increment) the wager (or portion thereof) relative to the threshold level or turnover amount and check to see if the threshold, or a pre-defined point relative to the threshold trigger (e.g., a pre-defined point of $0 relative to a threshold trigger of $1000 in a decrementing arrangement), is crossed. The wide-area CGC 400 would also contribute the wager to the WAP. The wide-area CGC 400 would then return, to the EGM 200 through the CGC 300 whether or not the player's wager triggered the progressive and the win amount, if any. The wide-area CGC 400 would also coordinate win shows with the gaming establishment's local CGC 300 across the WAP link (e.g., a hardwired or wireless communication pathway).

However, processing wagers at a remote location from the gaming establishment introduces delays in processing those wagers. It is possible that these delays may be noticeable to a player if the delays interfere with the game play of the base wagering game, such as where the base wagering game must wait for a response from the wide-area CGC 400.

Therefore, in accord with at least some aspects of the concepts disclosed herein, processing of individual bets for the wide-area progressive are performed at the local CGC 300 instead of at the wide-area CGC 400, and the wide-area CGC 400 will instead process requests for a block of threshold units by the local CGCs 300. A threshold unit, as used herein, is a fraction of, or a predefined portion of, the remaining threshold trigger or pre-defined point relative to the threshold trigger. In at least some respects, the threshold unit represents a discrete chance of triggering a progressive award. A block of threshold units may or may not actually contain a threshold unit that is associated with a threshold trigger to trigger a progressive award. At some point, the wide-area CGC 400 will distribute, to a local CGC 300, a block of threshold units that does contain a threshold unit associated with a threshold trigger to trigger a progressive award.

In accord with this system, when a new "round" of the bonus (e.g., a progressive bonus) begins, the wide-area CGC 400 determines the new threshold and the local CGCs 300 then request a new block of threshold units from the wide-area CGC 400. The wide-area CGC 400 deducts the entire amount of the block of threshold units from its threshold and transfers the block of threshold units to the local CGC 400. The local CGC 300 (e.g., CGC 300*a* in FIG. 4) then deducts EGM 200 bets from the block of threshold units stored in association with local CGC 300 until the local block of threshold units are less than or equal to zero, at which time the local CGC 300 then requests another block of threshold units from the wide-area CGC 400. This process is repeated across each local CGC 300 connected to the wide-area CGC 400 until, eventually, a local CGC 300 requests another block of threshold units from the wide-area CGC 400 that will cause the wide-area CGC threshold to cross the threshold (e.g., decreasing to zero, increasing to a set level, etc.). At this point, the wide-area CGC 400 will award a progressive level to that local CGC 300 (e.g., local CGC 300*a*) and reset the wide-area threshold. The local CGC 300 that was awarded the block of threshold units having a threshold unit associated with the threshold trigger will then deduct wagers from the block of threshold units until the local CGC 300 crosses the threshold trigger acquired from the wide-area CGC 400. The wager at the EGM 200 that met or exceeded the threshold trigger acquired by the local CGC 300 from the wide-area CGC 400 is awarded the progressive. In at least some aspects, the determination of the winning wager is performed by the local CGC 300 based on prior information acquired from the wide-area CGC 400 regarding the threshold trigger and randomly determined progressive award.

In accord with the architecture of FIG. 4, the problem of latency is solved because individual EGM 200 wagers are not processed by the wide-area CGC 400. Instead, they are processed by the local CGC 300. A request for a new block of threshold units can be made outside of any wager processing when the number of threshold units held by the local CGC 300 approaches zero based on the rate of play at the local CGC's gaming establishment. Thus, local CGC's 300 are not necessary constrained to wait until the local threshold units stored in association with local CGC 300 are in fact less than or equal to zero to request another block of threshold units from the wide-area CGC 400. Instead, the local CGC's 300, in at least some aspects of the present concepts, are permitted to obtain a block of threshold units from the wide-area CGC 400 prior to the depletion of the local CGC's 300 allocation of threshold units. For example, if a local CGC's 300 first block of threshold units will soon be depleted, based on rate of play, play history, or other metrics, the CGC 300 may be optionally permitted to obtain another block of threshold units prior to depletion of the inventory of threshold units.

In at least some aspects of the present concepts, instead of the progressives (or other award type) being directly and immediately funded by each individual wager, as is conventionally done, the local CGCs 300 in accord with at least some aspects of the disclosed concepts are requesting and receiving blocks of threshold units on credit (i.e., prior to the player actually contributing the wager) so that the progressive(s) are funded, at least in temporary increments, on credit. As the wagers come in, those contributions to the progressive pool(s) are used to offset the initial credit. However, in other aspects of the present concepts, the gaming establishment local CGC 300 purchases the block (c) of threshold units with its own funds, so that the progressive is fully funded, and to the extent a block of threshold units for a particular progressive award is not fully exhausted prior to the award of that progressive award, that contribution is used to purchase an equivalent block of threshold units (e.g., the same number of threshold units) in the reset progressive award (as opposed to the progressive award from which the block of threshold units was originally intended).

As noted above, at some point, a CGC 300 will obtain a threshold unit that bears the threshold trigger for the progressive (or other game). The threshold trigger itself may be randomly established (e.g., a mystery trigger) between a first value, which could be any value including zero, and a second value different from the first value. To illustrate, a first value could be $0 and a second value could be $3,000, with a threshold trigger being randomly determined to fall therebetween (e.g., $2,000). When a wager (e.g., $1, 4 credits, etc.) is placed at an EGM 200 connected to a local CGC 300 having allocated thereto a threshold unit associated with the threshold trigger, the wager amount is used to increment or decrement a counter, as appropriate to that particular game math used, to bring the counter closer to the threshold trigger. Continued play of the base wagering game at the EGMs 200 connected to such local CGC 300 continue to bring the counter closer and closer to the threshold trigger until one EGM 200 finally causes the counter to equal or pass the threshold trigger (e.g., reaching $0 on a decrementing counter). Whichever EGM 200 contributes that last coin that passes the threshold wins the progressive (or other game).

In the context of a progressive game with a mystery threshold trigger, as the counter operatively associated with the local CGC 300 trends past various milestones on its approach to the threshold trigger, the local CGC 300 may then optionally raise the anticipation level of the player's at the associated EGMS 200 by altering the game and display visuals to a "hotter" screen (e.g., a volcano being brought closer to eruption, an increasing heat wave, etc.), or the like. As an arbitrary visual reference, various points can be highlighted for the players such as, but not limited to, a level of contribution at which the progressive threshold triggered in an immediately prior iteration, a historical average of a contributions at which the progressive threshold triggered, or an average level of contribution as to the first value and the second value that define the lower and upper ends of the range within which the threshold trigger is determined and assigned.

Conventionally, each EGM 200 contributes wagers (or portions thereof) directly to a wide-area controller, where the wager (or portion thereof) is deducted from (or added to) the then-current state of the counter, however defined, for comparison to the threshold trigger. Although it is possible to have multiple gaming establishments linked in a wide-area progressive where multiple casinos are contributing wagers, or portions thereof, for comparison to a threshold trigger by a wide-area controller; however, latency issues arise from the different communication times from the different gaming establishments to the wide-area controller (e.g., latency between a player spinning the reels on a slot game and registering the value of the wager in the wide-area controller). But for the architecture disclosed herein, latency issues could even dictate that a player would have to wait until they receive clearance to continue with the play of the wagering game or, alternatively, continue to spin the reels or maintain the wagering game in an indeterminate state until such time as the EGM 200 receives configuration of the relation of the player's individual wager to the threshold trigger maintained on the wide-area controller.

Contrary to the conventional architecture wide-area controller both maintains the threshold trigger and processes each individual wager contribution from an EGM, the present concepts introduce local CGCs 300 to perform processing that would otherwise be performed by the wide-area CGC 400, to thereby distribute and accelerate the processing of wagers from the EGMs 200 and eliminate latency issues, particularly owing to the assignment of threshold units to the local CGCs and increased communication speed between the EGMs 200 and local CGCs 300. In one illustrative example, a local CGC 300 requests a block of threshold units from the wide-area CGC 400. The block of threshold units could be any predefined number of threshold units comprising, in the aggregate, a percentage or amount of the threshold trigger.

By way of example, a threshold on trigger a wide-area CGC 400 could be randomly determined to lie somewhere between a cumulative wager level of $3000 and $4000. Local area CGCs 300 are each permitted to obtain one block of threshold units of $100 (e.g., 100-$1 threshold units) at a time and the wagers input into the EGMs 200 at each local CGC 300 decrement from the block of threshold units until few threshold units remain (e.g., near or at zero, or rapidly approaching zero), at which time the local CGC 300 obtains another block of threshold units and the process continues. At some point, the local CGC's 300 enter into the range of the threshold units that are associated with the threshold trigger for the progressive award (or other type of award) wherein each local CGC 300 continues to request and obtain blocks of threshold units for depletion by associated EGMs 200.

In some aspects of the present concepts, the number of threshold units that are allocated to the local CGCs 300 per request remain fixed, regardless of the proximity of the wager-related metric to the threshold trigger. In other aspects of the present concepts, the blocks of threshold units allocated to the local CGCs 300 are larger when the cumulative wager level is far from the threshold trigger and are smaller when the cumulative wager level is close to the threshold trigger. By way of example, a block of threshold units could represent $200 worth of wagers (e.g., 200-$1 wagers) when the cumulative wager level is far from the threshold trigger, $50 worth of wagers when the cumulative wager level is close to the threshold trigger, and $20 worth of wagers when the cumulative wager level is very close to the threshold trigger. Thus, instead of always receiving a fixed block of threshold units, the local CGC 300 gives smaller blocks of threshold units as the threshold trigger is approached to help balance issues of fairness and drop off. In one example, when the threshold trigger is close to being triggered, the blocks of threshold units may approach small levels approximating individual wagers.

Determination a size of threshold units to allocate may comprise, or be dependent upon, one or more factors such as, but not limited to velocity (e.g., cumulative coin-in per defined unit of time, etc.), number of clients (e.g., local CGCs 300), historical data, time of day, day of the week, location of the clients, total participants, transmission speed of the clients (e.g., network latency), heuristics gathered over time, dynamic running average of wagering activity, etcetera.

In yet other aspects, together with defining a progressive award triggering condition, the wide-area CGC 400 defines a plurality of threshold units and assigns the award triggering condition to a randomly selected threshold unit. Thus, when blocks of threshold units are distributed to the local CGC's 300, each local CGC 300 has a theoretically equal chance of obtaining the threshold unit to which the award triggering condition is associated. This configuration would not exclude, for example, back to back progressive awards.

Ideally, the blocks of threshold units are sized so that any particular requesting local CGC 300 will be unlikely to hold on to excess threshold units for any significant period of time relative to the rate of play and the proximity to the threshold trigger (e.g., 1 minute, 2 minutes, 10 minutes, 15 minutes, 60 minutes, etc.) without being depleted. However, should a network latency between the local CGC 300 and the wide-area CGC 400 be particularly adverse, comparatively larger blocks of threshold units may be advantageously allocated to the local CGCs 300 to reduce the impact of such latency. It is generally preferred, but not necessary, that the blocks of threshold units allocated by the wide-area CGC 400 are comparatively smaller, resulting in more frequent requests of blocks of threshold units by the local CGCs 300, so long as the latency issues noted above are perceptably avoided.

One potential issue with the allocation of threshold units to the local CGCs 300 is that there is a potential for the rate of wagering game play to unexpectedly decrease, for whatever reason, causing the threshold units to grow stale. Parsing out small blocks of threshold units may help avoid a situation where a single gaming establishment holds onto a threshold unit associated with a threshold trigger for an excessive period of time. The issue of staleness of threshold units might not cause a problem if none of the wagers placed on the EGMs 200 associated with the threshold units held by the local CGC 300 are destined to cause the realization of the threshold trigger, but if the threshold units held by the local CGC 300 include a threshold unit associated with the threshold trigger, it is possible that the progressive award or other type of award depending on the wagering game, will go unawarded for an extended period. To combat this problem, the threshold units may, in whole or in part, be subject to a decay timer or other device to revert the block of threshold units, in whole or in part, back to the wide-area CGC 400. The decay timer is configured so that if a certain predetermined condition isn't met, or predetermined conditions aren't met, then a portion of the block of threshold units or all of the threshold units is returned to the wide-area CGC 400. In at least some aspects, the threshold units paid for on credit by the gaming establishment or client can be rolled into the next progressive jackpot where they were not yet used to fund the progressive award. The wide-area CGC 400 then determines the next progressive threshold trigger and compares the threshold trigger to the returning threshold units to determine whether or not the new progressive jackpot should be awarded to any of those returning threshold units, awarding such new progressive jackpot if the answer is in the affirmative and continuing play otherwise.

In one example, such a decay timer could be initialized when the local CGC 300 is provided the threshold unit by the wide-area CGC 400 and, when the decay timer expires, the threshold unit is returned to the wide-area CGC 400 and the local CGC 300 is required to obtain a new block of threshold units from the wide-area CGC 400 with a newly initiated decay timer. Alternatively, the wide-area CGC 400 can maintain a decay timer for each threshold unit that it assigns to a local CGC 300 and, following lapse of the decay timer without a signal from the local CGC 300 indicating that the local CGC 300 has fully utilized or consumed the allocated threshold units, the wide-area CGC 400 issues a retraction calling back the remainder of the threshold units or a query regarding the disposition of the block of threshold units. Stated differently, the wide-area CGC 400 can determine the extent to which the threshold units allocated to the local CGC 300 were utilized and optionally collect the remainder.

As an alternative to such a decay timer, in a situation where a threshold trigger for a progressive award or other award (e.g., progressive award 1) is, in effect, stuck in limbo in a low-traffic local CGC 300, a new threshold trigger is created and initiated (e.g., progressive award 1') in accord with at least some aspects of the present concepts, so that there could be another winner while the system is waiting for the local CGC 300 and associated EGMs 200 to trigger the first threshold trigger for the particular progressive award (i.e., progressive award 1 in this example). As noted above, however, it is generally preferred to avoid added complexity and computational requirements and, instead, manage the size of or extent of the threshold units that are allocated by the wide-area CGC 400 to the local CGCs 300.

In at least some aspects, as noted above, the wide-area CGC 400 may limit a local CGC 300 to possession of a single, small block of threshold units for a progressive or other award at any given time. This would help avoid, for example, hoarding of multiple blocks of threshold units by a gaming establishment or client local CGC 300 and stalling of an award by subsequent inactivity of the gaming establishment or client local CGC 300.

As noted above, one objective of the architecture in accord with the concepts disclosed herein is to reduce system latency and computation issues that have the potential to impact wagering game play. As also noted above, one solution provided by the concepts herein is for the wide-area CGC 400, having determined where the trigger threshold (e.g., $5000 of wagers within a disclosed range of between $3000 and $6000) is for a particular progressive award or other award, subdivide the range of required wagers or contributions into threshold units (e.g., $500) that are relatively large at first and then to reduce the size of the allocated blocks of threshold units as the trigger threshold is approached.

Although, once a block of threshold units has been dispensed by the wide-area CGC 400 a target local CGC 300, it may be exclusively retained by the target local CGC 300, as described above, the wide-area CGC 400 may instead start to reverse the process in an alternative embodiment. Thus, at the point at which a threshold unit associated with the threshold trigger is distributed to a local $CGC_1$ 300, instead of allowing that local $CGC_1$ 300 to exclusively play through the threshold units in accord with the input wagers at the EGMs 200, the wide-area CGC 400 may be configured to receive wagers (e.g., bet by bet, clumped wagers, etc.) from other local CGCs 300 (e.g., local $CGC_1$ . . . local $CGC_N$) and subtract them from the remaining threshold units of local $CGC_1$ 300.

Further, although the incrementing or decrementing of threshold units from the allocated block of threshold units is generally described herein as progressing from a specific start point and moving toward a specific end point, purely by way of example, the incrementing or decrementing of the threshold units from the block of threshold units held by the local CGC 300 may advantageously be random. For example, if the block of threshold units comprises 400 threshold units, each threshold unit correlating to $0.25, and the block of threshold units being envisaged as covering a continuum of wagers from $2000 to $2100, a player's $0.25 wager might be randomly associated with an outcome associated with a randomly selected one of the threshold units (e.g., the $2022.75 threshold unit, even though the $2022.50 and $2023.00 threshold unit have not been realized).

In yet another embodiment, when the wide-area CGC 400 is set to dispense a block of threshold units comprising the threshold unit associated with the threshold trigger, instead of assigning the block of threshold units to a single local CGC 300, the wide-area CGC 400 is configured to send each connected local CGC 300 an essentially duplicate version of the block of threshold units so that the EGMs 200 for each local CGC 300 can compete equally to reach the threshold trigger and win the progressive award, or other type of award. In such as embodiment, latency issues are minimized by the wide-area GCG 400 only monitoring for the winning threshold unit. Following a win of the progressive, the previously allocated threshold units from local CGC's 300 are withdrawn or cancelled and new threshold units are issued for subsequent wagering activity at the local CGCs 300. Theoretically, should players on two separate local CGC's 300 (e.g., at two different locations or two different casino's) hit the winning threshold at precisely the same instant of time, as registered by the wide-area CGC 400, one player may be awarded the progressive and the other player may be awarded the reset value of the progressive.

As another embodiment, to enhance fairness between competing local CGCs 300 in the example where each connected local CGC 300 receives an essentially duplicate version of the block of threshold units containing the threshold trigger, differentiated threshold units may be given to the different local CGCs 300 so that the size of the block of threshold units and/or size of the constituent threshold units, are normalized to each recipient CGC 300 (e.g., normalized with respect to a dynamic rate of play, normalized with respect to monitored network speeds, etc.) so that each local CGC 300, and more particularly each player, has a roughly equal chance to trigger the progressive in this race to trigger the last sub-unit that is associated with the progressive award (or other award).

In another embodiment, rather than a player at an EGM 200 actually being eligible for a progressive award or other award on a wide-area CGC 400 on every spin or play of the base wagering game, each play of the base wagering game and/or each increment of wager wagered by the player adds a ticket or ticket portion or the like to a player's counter (e.g., a player account). Each time a player's threshold of tickets, or the like, exceeds a given threshold (e.g., a predetermined threshold, a dynamic threshold based on rate of play or cumulative wagers, etc.), a single communication is made from the EGM 200, either directly or through a local CGC, to the wide-area controller and back to the players EGM 200. In essence, a block of base wagering game activity by a player is used to generate a chance at an award on the wide-area CGC, rather than each individual wager and play generating a chance at such award.

Returning to the funding of the jackpots, in a typical progressive, a percentage of varying percentage of input wagers are used to fund the progressives and the progressive awards (e.g., four levels of progressive awards are in-play) are shown to increase as additional wagers are input. The input contributions may be allocated to one progressive or divided to fund a plurality of progressives. This funding is performed essentially in real-time as the money is wagered on the EGMs and each wager, or pre-determined portion thereof, is used to decrement (or increment toward) a mystery trigger until the progressive is actually triggered. In accord with the credit-based funding of the progressives in the model wherein the local CGCs 300 pay, on credit, for the allocation of threshold units, the display of the progressive awards may remain static between requests for threshold units from the local CGCs 300 and update each time a local CGCs 300 updates its contributions to repay the credit that that local CGC 300 was owing from the prior allocated block of threshold units. In accord with another aspect, to avoid the step-wise increases or "jumping" the jackpot, the progressive displays may optionally reflect a rate of contribution that approximates, or is slightly less than, a rate of play across the local CGCs 300. In such aspects, upward step-wise corrections to the displayed progressives are minimized.

In yet another embodiment, a mystery award, which may be a progressive, is configured not to trigger by a certain amount, but instead based on a random condition that is communicated from the wide-area CGC 400 to the local CGCs 300. The local CGCs 300, in turn, monitor the EGMs 200 associated therewith to see if any EGM 200 satisfies the condition. Every play of every wagering game, the local CGCs 300 monitor the EGMs 200 and, if the condition is satisfied, the local CGC 300 notifies the wide-area CGC 400, which then notifies the remaining local CGCs. As one example, in a first step, a wide-area CGC 400 determines what the winning number will be, such as the number 1 out of 17 million possible numbers, which could be randomly determined or could be a constant. In a second step, at each EGM 200, on each spin, a check is made, either by the EGM 200 or by the local CGC 300, to determine whether the player's wagering game outcome (and/or wager) qualifies to win the progressive. For example, a player might need to wager a minimum wager to be eligible for the progressive (e.g., Max-Bet wager) or might need to obtain a winning outcome to be so eligible, etcetera. Certain conditions may permit enhanced consideration, such as additional chances to qualify to win the progressive (e.g., payment of a higher bet level, such as an extra bet). Thus, a player wagering $5 (or 5 credits) may have five times as many opportunities on a given play as a player who wagered $1 (or 1 credit). Once past this second step, a third step includes the EGM 200 or local CGC 300 determining a random number and comparing it to the random number previously generated by the wide-area CGC 400 to see if there is a match. Step 4 is notification by the EGM 200 or local CGC 300 to the wide-area CGC 400 that the EGM 200 has won the progressive.

Figure 5:
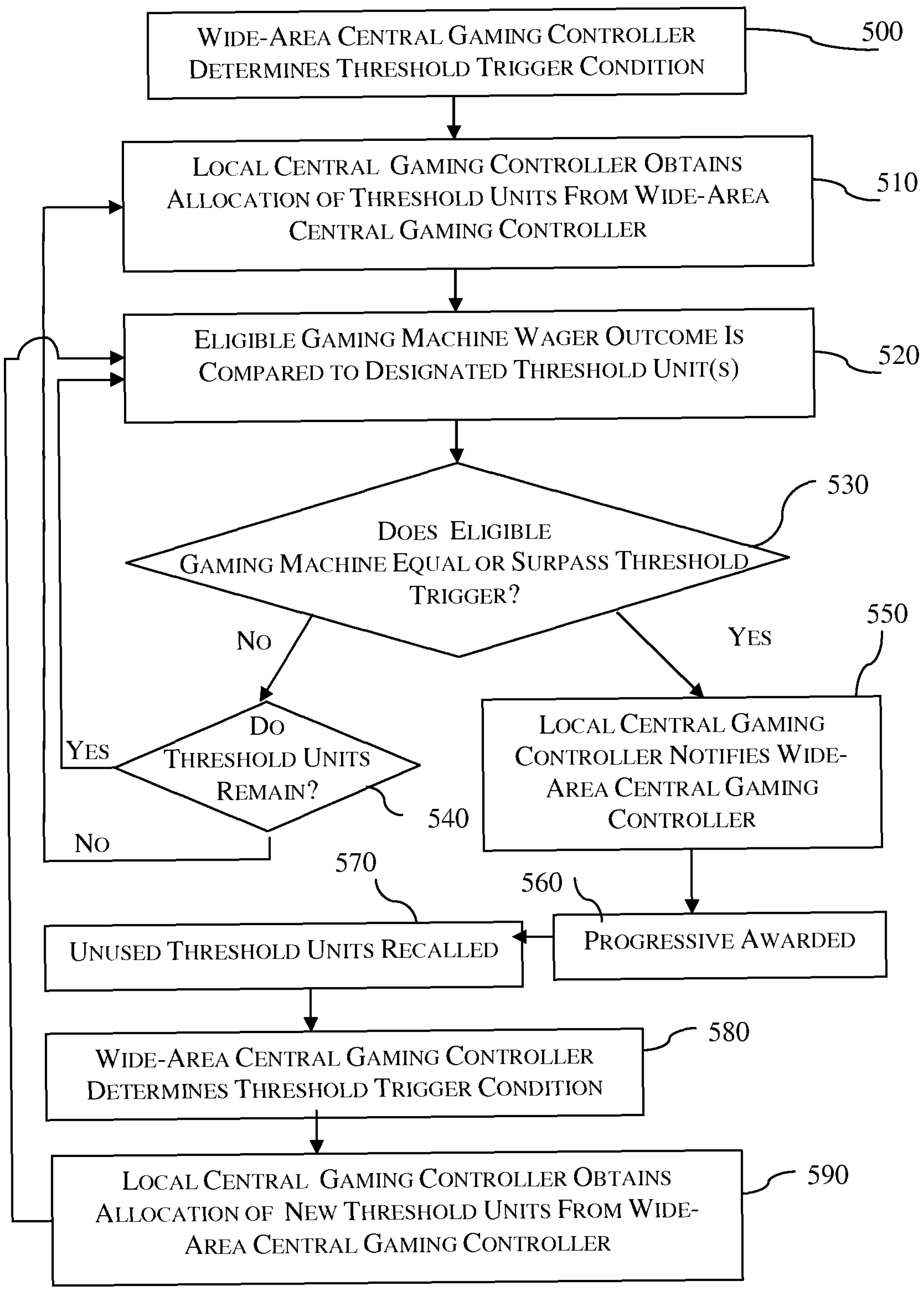
FIG. 5 is a flowchart for an algorithm that corresponds to instructions executed by in association with a wide-area wagering game in accord with at least some aspects of the disclosed concepts.

FIG. 5, described by way of example above, represents one algorithm that corresponds to at least some instructions executed by the controller 42 and/or external systems 46 in FIG. 2 to perform the above described functions associated with the disclosed concepts.

Figures 6A, 6B, 6C:
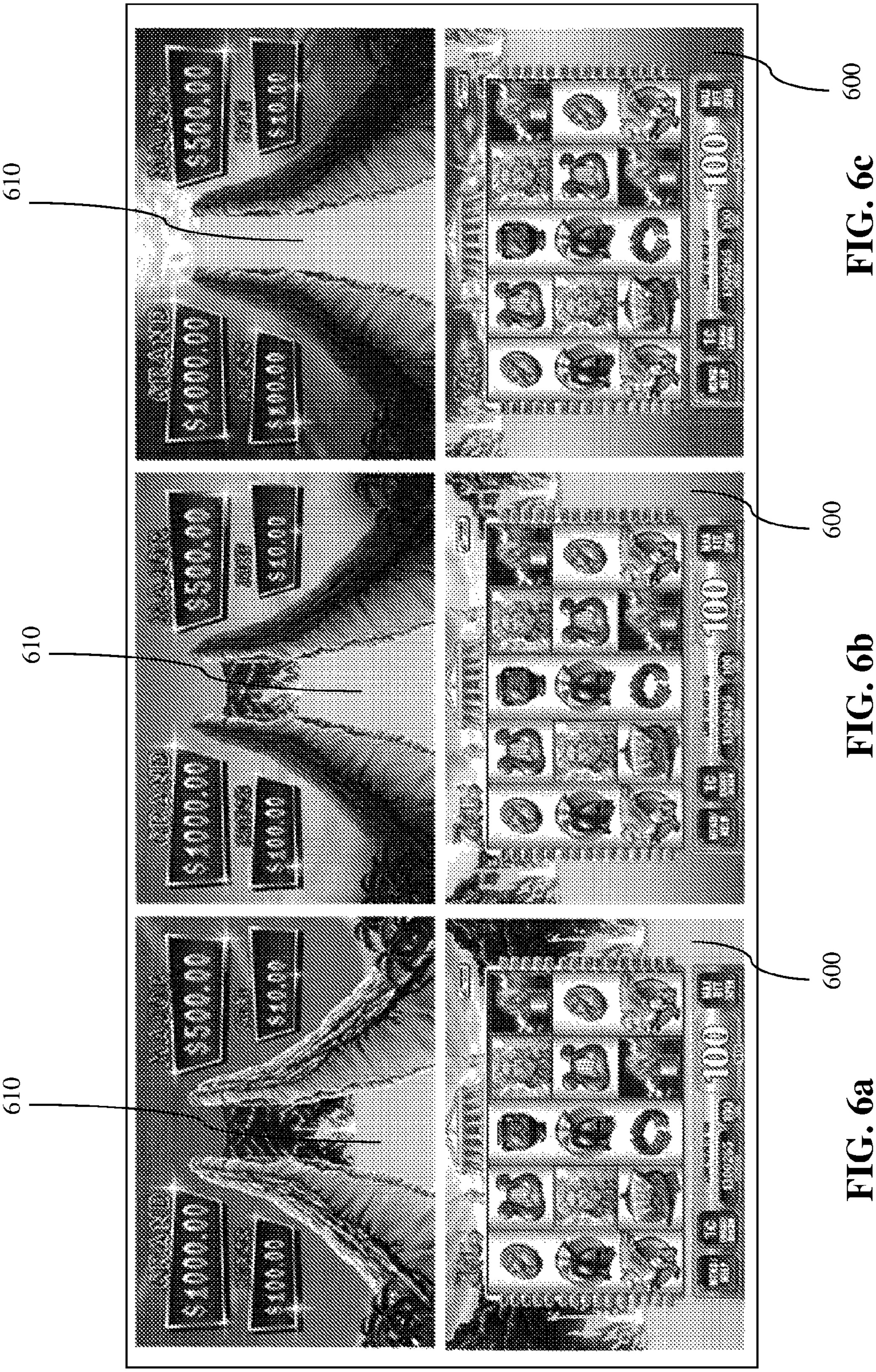
FIGS. 6*a*-6*c* are illustrations of a wagering game that could be conducted on the wide-area wagering game in accord with at least some aspects of the disclosed concepts.

Referring now to FIGS. 6*a*-6*c*, an "ultra hit progressive" ("UHP") game is illustrated as an example of a progressive game that may be implemented in accord with at least some aspects of the present concepts. The UHP game is a threshold triggered progressive wherein, for example, all player wagers or "coin-in" are decremented from a counter starting at a randomly selected threshold trigger amount (e.g., a randomly selected amount of "coin-in") until one player or gaming terminal causes the counter to become equal to zero or less than zero. Alternatively, all player wagers are incremented from a zeroed counter until the sum of the wagers approaches and then equals or exceeds the randomly selected threshold trigger amount. The player that contributes the final wager to cross the threshold trigger level, however defined, wins one of the progressive levels in accord with the relevant game logic (e.g., random selection of the winning progressive level).

In at least some aspects of the UHP, the wagering game machine and/or secondary or area displays display stimulating visual clues to the player to indicate, in relative terms, how close the system is to triggering a progressive (or other applicable award). In accord with yet other aspects, the UHP is a 4-level local area progressive with a mystery trigger. As players play the electronic gaming machines 200 (see FIG. 4), portions of each wager are used to fund the progressive(s), either directly from the wager or indirectly funded from reduced paytables in a base wagering game (e.g., the progressive jackpot(s) pool(s) are funded by percentage contributions of a gaming machine's turnover).

Implementation of a WAP in accord with aspects of the present concepts may be illustrated by reference to the general flowchart of FIG. 5. A wide-area CGC 400 (see FIG. 4), such as for the UHP, determines a threshold trigger or "strike" threshold, as is represented in act 500 in the flowchart of FIG. 5. In act 510, local CGCs 300 obtain individual allocations of threshold units (e.g., a block of threshold units) from the wide-area CGC 400. Once each local CGC 300 has obtained its allocation of threshold units, an eligible gaming machine 200 wager and/or outcome, as appropriate, is compared in act 520 to designated threshold unit(s) held by the local CGC 300 and, in act 530, the local CGC 300 determines whether or not the eligible gaming machine 200 has achieved the threshold trigger that may be associated with one of the threshold units allocated to the local CGC 300. In act 540, the local CGC 300 determines if any threshold units remain for application to a subsequent eligible gaming machine 200 wager and/or outcome. If not, control passes back to act 510 where the local CGC 300 obtains another allocation of threshold units (e.g., a block of threshold units) from the wide-area CGC 400 and the process continues. If, however, threshold units are determined to remain for utilization by the local CGC 300, the local CGC 300 proceeds to act 520 to again compare an eligible gaming machine 200 wager and/or outcome to designated threshold unit(s) held by the local CGC 300 to then determine, in act 530, whether or not the eligible gaming machine 200 has achieved the threshold trigger.

Should the local CGC 300 determine in act 530 that the eligible gaming machine 200 has achieved the threshold trigger, the local CGC 300 notifies the wide-area CGC 400 of the satisfaction of the threshold trigger and the wide-area CGC 400 awards the progressive (or a randomly selected one of the progressives in accord with the UHP example) to the eligible gaming machine 200 in act 560. Following awarding of the progressive award in act 560, the wide-area CGC 400 recalls any outstanding threshold units in act 570, resets the applicable progressive award, determines a new threshold trigger in act 580, and allocates to the local CGCs 300 blocks of new threshold units in act 590. The local CGCs 300 then proceed in act 520 to compare eligible gaming machine 200 wagers and/or outcomes to designated threshold unit(s) held by the local CGC 300.

In the UHP example, in association with each new progressive session, the wide-area CGC 400 also randomly determines, further to the threshold trigger, the next winning progressive level (e.g., one of "Mini," "Minor," "Major," and "Grand" as shown in FIGS. 6*a*-6*c*).

In accord with at least some aspects of the present concepts, such as in the UHP example, since the value of the strike threshold is known to the system, the system is able to inform the players as to the proximity of the system (e.g., via cumulative wagers compared to a threshold condition of cumulative wagers) to the threshold. The increasing chances of triggering the progressive are represented visually, such as is shown, by way of example, in FIGS. 6*a*-6*c*, wherein backgrounds of base games are altered and the backgrounds of the secondary displays, which show the progressive game at all times, are also altered to intensify the color scheme as the progressive award looms closer. As shown in the progression of FIGS. 6*a*-6*c*, the lava 600 depicted adjacent the basic wagering game reels increases in height as does the height of lava 610 in the volcano depicted in the secondary display.

Although not shown in FIG. 5, after the progressive award is reset and the wide-area CGC 400 determines a new threshold trigger in act 580, the wide-area CGC 400 optionally may be configured to compare the recalled threshold units to the new threshold trigger to determine whether any of the EGMS 200 associated with the local CGC 300 that returned the threshold units qualified to satisfy the new threshold trigger. Thus, if a second progressive jackpot (e.g., "Mini" Jackpot No. 2) were to be triggered by a second player while a first player is being awarded the first progressive jackpot (e.g., "Mini" Jackpot No. 1), and the progressive jackpot level is determined to be the same (e.g., "Mini"), the second player will be awarded the reset value (e.g., reset of "Mini" jackpot).

Each of these embodiments and obvious variations thereof is contemplated as falling within the spirit and scope of the claimed invention, which is set forth in the following claims.

The invention claimed is:

1. A wagering game system comprising:

a wide-area central gaming controller; and a communication system configured to communicatively couple the wide-area central gaming controller to one or more local central gaming controllers, wherein the wide-area central gaming controller is operatively configured to:

(i) determine a threshold trigger for awarding a wide-area award, the threshold trigger relating to a cumulative wager contribution;

(ii) divide the cumulative wager contribution required to satisfy the threshold trigger into a plurality of blocks of threshold units, each threshold unit relating to a wagering contribution, with only one of the plurality of blocks of threshold units having a target threshold unit associated with a satisfaction of the threshold trigger;

(iii) distribute a block of threshold units selected from the plurality of blocks of threshold units to one of the one or more local central gaming controllers;

(iv) subtract the distributed block of threshold units from the plurality of blocks of threshold units;

(v) distribute to at least one of the one or more local central gaming controllers blocks of threshold units, selected from remaining ones of the plurality of blocks of threshold units, until a distributed block of threshold units is determined to comprise the target threshold unit; and (vi) reset the wide-area award to a reset value following distribution of the one block of threshold units comprising the target threshold unit.

2. The wagering game system of claim 1, wherein the wide-area central gaming controller is configured to determine if a distributed block of threshold units comprises the target threshold unit.

3. The wagering game system of claim 1, wherein each of the one of the one or more local central gaming controllers to which a block of threshold units was distributed is configured to determine if the respective received block of threshold units comprises the target threshold unit and to notify the wide-area central gaming controller if a received block of threshold units is determined to comprise the target threshold unit.

4. The wagering game system of claim 1, further comprising:

distributing the wide-area award to a local central gaming controller to which the target threshold unit was distributed, and awarding the wide-area award to a wagering game machine, connected to the local central gaming controller, associated with the target threshold unit.

5. The wagering game system of claim 3, wherein each of the one of the one or more local central gaming controllers evaluates a wager contribution from each eligible wagering game machine connected thereto to determine if the wager contribution is associated with the target threshold unit.

6. The wagering game system of claim 4, wherein the wide-area award comprises a progressive award.

7. The wagering game system of claim 4, wherein the wide-area progressive award comprises a mystery threshold trigger.

8. The wagering game system of claim 1, wherein the wide-area central gaming controller is configured to distribute blocks of threshold units in a predetermined sequence from the available remaining ones of the plurality of blocks of threshold units.

9. The wagering game system of claim 1, wherein the wide-area central gaming controller is further operatively configured to output to each of the one or more local central gaming controllers a threshold unit status indicator relating to the relative position of the threshold unit associated with the threshold trigger to the threshold units already dispensed to the one or more local central gaming controllers.

10. The wagering game system of claim 1, wherein each of the one or more local central gaming controllers purchase the block of threshold units distributed thereto.

11. A wagering game system comprising:

a wide-area central gaming controller configured to determine a threshold trigger for awarding a wide-area award, the threshold trigger relating to a cumulative wager contribution, and to divide the cumulative wager contribution required to satisfy the threshold trigger into a plurality of blocks of threshold units, each threshold unit relating to a wagering contribution, with only one of the plurality of blocks of threshold units having a target threshold unit associated with a satisfaction of the threshold trigger;

a plurality of local central gaming controllers;

a plurality of wagering game machines connected to each of the plurality of the local central gaming controllers, and a communication system configured to communicatively couple each of the local central gaming controllers to the wide-area central gaming controller, wherein the wide-area central gaming controller is operatively configured to distribute available blocks of threshold units to the local central gaming controllers until a distributed block of threshold units is determined to comprise the target threshold unit and to reset the wide-area award to a reset value following distribution of the block of threshold units comprising the target threshold unit, wherein each of the local central gaming controllers are operatively configured to:

(i) receive from the wide-area central gaming controller a block of threshold units selected from an available set of threshold units, the available set of threshold units comprising one threshold unit that is uniquely associated with a threshold trigger for a wide-area award managed by the wide-area central gaming controller;

(ii) assign from the received block of threshold units one or more threshold units to an eligible wagering game machine;

(iii) evaluate the assigned one or more threshold units to determine if the assigned one or more threshold units comprise the one threshold unit that is uniquely associated with the threshold trigger;

(iv) remove the assigned one or more threshold units from the available threshold units in the block of threshold units following the act of evaluating; and (v) perform acts (i) through (iv) until the target threshold unit is assigned to an eligible wagering game machine or until all threshold units in the block of threshold units have been assigned to respective wagers and evaluated.

12. The wagering game system of claim 11, wherein the wide-area award comprises a progressive award.

13. The wagering game system of claim 11, wherein the wide-area progressive award comprises a mystery threshold trigger.

14. The wagering game system of claim 11, wherein an eligibility of a wagering game machine is conditioned on at least one of a minimum required wager level or a minimum required turnover.

15. The wagering game system of claim 11, wherein each of the local central gaming controllers are configured, upon receipt of a threshold unit status indicator from the wide-area central gaming controller, alter a graphical representation of a base wagering game, a base wagering game background display, or a secondary display to graphically indicate a relative position of the target threshold unit to threshold units already distributed by the wide-area central gaming controller.

16. The wagering game system of claim 11, wherein each of the local central gaming controllers purchase the block of threshold units distributed thereto.

17. A method of conducting a wagering game on a gaming system, the method comprising:

determining a threshold trigger for awarding of a wide-area award using a wide-area gaming controller, the threshold trigger relating to a cumulative wager contribution;

dividing a condition prerequisite for the threshold trigger into a set of threshold units using the wide-area gaming controller, one of the threshold units, a target threshold unit, being uniquely associated with the threshold trigger;

distributing blocks of the threshold units to one or more local central gaming controllers using the wide-area gaming controller;

determining if a threshold unit distributed in the distributed blocks corresponds to the target threshold unit uniquely associated with the threshold trigger; and resetting the wide-area award to a reset value using the wide-area gaming controller following distribution of a block of threshold units comprising the target threshold unit.

18. A method of conducting a wagering game on a gaming system according to claim 17, wherein the act of determining is performed by the wide-area gaming controller.

19. A method of conducting a wagering game on a gaming system according to claim 18, the method further comprising:

awarding the wide-area award to an eligible wagering game machine associated, by a respective local central gaming controller, to the target threshold unit.

20. A method of conducting a wagering game on a gaming system according to claim 19, the method further comprising:

conditioning eligibility of a wagering game machine on at least one of a wager input, a minimum required wager input, or a minimum required turnover.

* * * * *